United States Patent

[11] 3,592,529

[72] Inventors Lawrence A. Juhlin, Jr.
Greenville, Ill.;
Michael Graser, Jr., Bedford, Mass.
[21] Appl. No. 16,421
[22] Filed Mar. 4, 1970
[45] Patented July 13, 1971
[73] Assignee General Electric Company

[54] LENTICULAR LENS ARRAY FOR OPTICAL PROJECTION SYSTEM
8 Claims, 6 Drawing Figs.

[52] U.S. Cl. .................................................. 350/162 R,
178/5.4 BD, 178/7.87, 350/161, 350/162 SF,
350/167
[51] Int. Cl. ...................................................... G02b 27/38
[50] Field of Search ........................................... 350/162,
162 SF, 161, 167; 178/5.4 BD, 7.87

[56] References Cited
UNITED STATES PATENTS
3,330,908 7/1967 Good et al. .................. 350/162 SF

*Primary Examiner*—John K. Corbin
*Attorneys*—Marvin Snyder, W. J. Shanley, Jr., Frank L. Neuhauser, Oscar B. Waddell and James B. Forman

ABSTRACT: In light valve projection apparatus employing a light-modulating medium and a Schlieren optics input mask having two sets of slots, each set oriented in a different direction and illuminated by light of a different color emanating from a common source so as to produce light of both colors on the medium, center-to-center spacing of the slots in one set is made independent of center-to-center spacing of the slots in the other set. Lenticular lens of two different aspect ratios image the source in either color, respectively, onto the slots of either set, respectively, through an additional mask.

PATENTED JUL 13 1971

INVENTORS:
LAWRENCE A. JUHLIN, JR.
MICHAEL GRASER, JR.

BY *Marvin Snyder*
THEIR ATTORNEY.

3,592,529

PATENTED JUL 13 1971

INVENTORS:
LAWRENCE A. JUHLIN, JR.
MICHAEL GRASER, JR.

BY Marvin Snyder
THEIR ATTORNEY.

LENTICULAR LENS ARRAY FOR OPTICAL PROJECTION SYSTEM

INTRODUCTION

This invention relates to light valves for optically projecting, in color, images generated electronically on a light-controlling layer, and more particularly to apparatus for increasing the range of intensity variation and improving color purity in the displayed image.

One form of light valve suitable for optical projection of electronically generated images onto a remote display surface comprises an evacuated enclosure containing an electron gun in predetermined alignment with a transparent disc. The disc is rotated through a reservoir of light modulating fluid to deposit a continuously replenished layer of fluid on the disc surface. An electron beam is scanned, in raster fashion, across a portion of the light modulating fluid layer so as to selectively deform the layer. The fluid deformations thus formed constitute optical diffraction gratings which, in conjunction with Schlieren optical input and output masks, selectively control passage of light from a light source through the disc and through an output window in the enclosure envelope in order to create visible images at a remote display surface on which the light impinges.

In particular, the diffraction gratings are formed by directing the electron beam onto the fluid layer and horizontally deflecting the beam across the surface of the layer in successive, substantially parallel paths. By velocity modulating the beam with signals corresponding to two primary colors, typically red and blue, the speed of horizontal deflection along these paths is varied in a periodic manner at a frequency considerably greater than the frequency of occurrence of each scan line or parallel path, producing vertically directed diffraction gratings corresponding to the red and blue signals, respectively. An addition, horizontally directed diffraction gratings, corresponding to the green signal, are formed by the horizontal scan lines or parallel paths of the scanning electron beam. The horizontally directed diffraction gratings are wobble modulated; that is, the size of the spot formed by the beam is varied in accordance with green signal modulation.

To enable projection of three primary colors from a common layer of viscous fluid, the line-to-line spacing of each diffraction grating formed on the fluid layer produces a specific angle of light deviation unique to any given color impinging on the fluid layer. Light emerging from the diffraction gratings is directed onto a Schlieren output mask having apertures therein of predetermined extent and at predetermined locations in order to pass the primary colors selected to be projected. The line-to-line spacing of each of the three primary color diffraction gratings is used to determine the correct width and location of the cooperating slot in the Schlieren output mask to pass the respective primary color when a diffraction grating corresponding to production of that color has been formed in the fluid layer. Depth of fluid layer deformation in each diffraction grating is varied in accordance with density of charge deposited by the electron beam so as to produce corresponding variations in intensity of light passed by the diffraction grating. A system of this type is described and claimed in W.E. Good, et al. U.S. Pat. No. 3,325,592, issued June 13, 1967 and assigned to the instant assignee.

In employing a large area light source with Schlieren optics in a color projector, efficiency of light transmission can be relatively low since the percentage of the total light passing the Schlieren input mask in determined by the ratio of the area of clear slots to the total area of the mask. This ratio typically ranges between 12 percent and 28 percent, depending upon the specific mask configuration. In order to improve efficiency, therefore, a small area light source has been combined with a lenticular lens array so as to form an array of light source images at the plane of the Schlieren input mask. By ... ing the source images fall only on the clear slots, very little light is lost at the Schlieren input mask, resulting in improved light transmission efficiency.

Situating a second array of lenticular lenses as close as possible to the slots of the Schlieren input mask will result in the array of light source images falling, respectively, upon the centers of the lenticules of the second lenticular array. If the individual lenticules on the first lens array have the same shape or aspect ratio as the raster generated electronically on the fluid layer, and the focal length of each lenticule in the second array is chosen so as to form an image of a corresponding lenticule of the first lenticular array at the raster, the raster may be illuminated with a rectangular body of light. If the size of the lenticules in the first lenticular array and their spacing from the second lenticular array are proper, the magnification may be chosen so the light exactly fills the raster. This avoids the light loss at the raster which would otherwise occur if a circular light body were used to illuminate the rectangular raster. Moreover, by evenly illuminating each lenticule of the first array, illumination at the raster is also uniform.

For proper operation of a lenticular lens system such as described above, several constraints must be met. Center-to-center spacing of the lenticules in the second lens array must match the spacing of the slots in the Schlieren input mask since each lenticule must be situated in front of an input slot. Moreover, to insure that all the lenticular images are superimposed properly at the raster, imaginary lines joining the centers of lenticules in the first array with their corresponding lenticules in the second array, respectively, must all intersect at the center of the raster.

Lenticular lens systems employed in light valve projector apparatus have heretofore required that the aspect ratio, or ratio of the height to width of each individual lenticule, be the same as that of the raster. Accordingly, the overall array of source images at the Schlieren input mask must have this same aspect ratio. The ratio of vertical slot spacing to horizontal slot spacing in the input mask, which corresponds to the slot spacings for two different colors, must therefore likewise be equal to the raster aspect ratio. This has the effect of requiring that a compromise be made in design of the system since the optimum slot spacing for one color is not the same as the optimum slot spacing for another color. As a result of such compromise, either resolution or efficiency may be degraded, or both. In addition, second order images for a particular color may not be completely blocked when a dark field for that color is required for display.

The present invention is concerned with eliminating constraints on the Schlieren input mask slot openings, so as to allow optimum horizontal slot spacing and optimum vertical slot spacing for the particular color illuminating the horizontal and vertical slots, respectively. This is achieved by employing lenticular lenses of a first size to direct light of a first color through the vertical apertures and by employing lenticular lenses of a second size to direct light of a second color through the horizontal apertures. By so doing, center-to-center spacing of the vertically directed Schlieren input mask slots is made independent of center-to-center spacing of the horizontally directed input mask slots, facilitating achievement of improved resolution or efficiency, or both, by allowing optimum selection of diffraction orders. In addition, improvement is achieved in dark fields for specific colors.

Accordingly, one object of the invention is to provide light valve projection apparatus in which center-to-center spacing of Schlieren input mask slots illuminated by light of one color is completely independent of center-to-center spacing of Schlieren input mask slots illuminated by light of a second color.

Another object is to provide valve projection apparatus in which lenticular lenses aligned with apertures in a Schlieren input mask are of different sizes according to the color with which they are illuminated.

Another object is to provide light valve projection apparatus in which the degree of precision required for the inner perimeter of a raster stop is reduced.

Another object is to provide light valve projection apparatus of enhanced resolution, efficiency, or both, having improved dark fields for specific colors.

Briefly, in accordance with a preferred embodiment of the invention, a light valve system for projecting images in color comprises a light modulating medium situated between a source of bichromatic light and an image display screen. First and second arrays of lenticular lenses are situated in the path of the bichromatic light, with the lenses of the first array being of substantially identical size and the lenses of the second array illuminated by light of a first color having a different aspect ratio than the lenses of the second array illuminated by light of the second color. A light input mask of predetermined Schlieren optics configuration is situated adjacent the first array of lenses while a light output mask, of configuration bearing a complementary relationship to the input mask configuration, is situated between the light-modulating medium and the display screen. In the input mask, spacing of slots illuminated by light of the first color is different from spacing of slots illuminated by light of the second color, depending upon relative sizes of the lenses in the second array illuminated by light of the first and second colors. This enables slots in the light input mask to be optimally spaced for each of the respective illuminating colors.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description taken in conjunction with the accompanying drawings in which:

DESCRIPTION OF TYPICAL EMBODIMENTS

Figure 1:
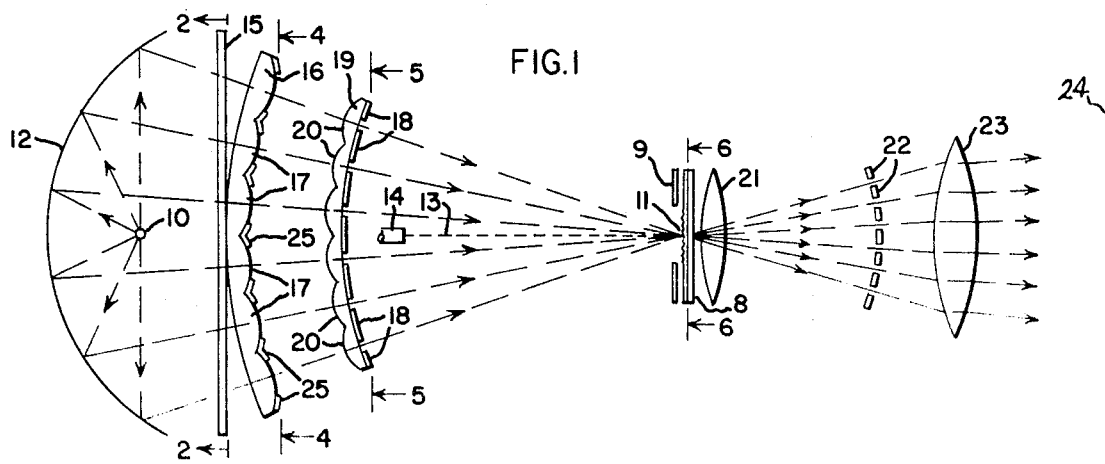
FIG. 1 is a schematic diagram of an optical projection system employing the apparatus of the instant invention.

FIG. 1 illustrates, in schematic form, a deformable medium optical projection system of the general type shown and described in W.E. Good et al. U.S. Pat. No. 3,330,908, issued July 11, 1967 and assigned to the instant assignee. The system employs a source of intense light 10, such as a xenon arc lamp, situated at one focus of an elliptical reflector 12. The center of the active area of a light modulating medium 11, typically a viscous fluid such as polybenzyl toluene having a viscosity of 1,000 centistokes at an operating temperature of about 50° C., is situated at the other focus of elliptical reflector 12. Light-modulating medium 11 is supported by an optically transparent disc or substrate 8. The active area of light-modulating medium 11, delineated by the inner perimeter of a stop 9, comprises the portion of medium 11 capable of being deformed into optical diffraction gratings by electrical charge deposited by a scanning electron beam 13 originating at an electron gun 14. By employing an elliptically shaped reflector, light rays emanating from source 10, indicated by dashed lines with arrows thereon, are reflected in convergent fashion toward the center of the active area of light-modulating medium 11.

Figure 2:
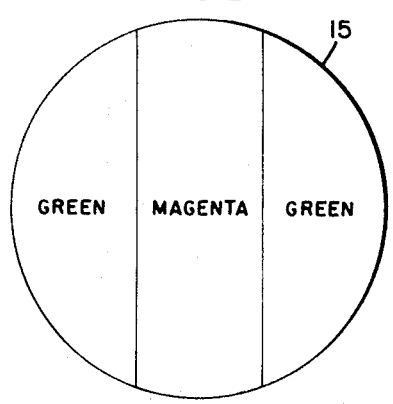
FIG. 2 is a plan view of a bichromatic optical filter which may be employed in the system of FIG. 1, as viewed along line 2-2 of FIG. 1.

A bichromatic optical filter 15, situated on the output side of elliptical reflector 12, serves to segregate the white light emitted by source 10 into two of its constituent colors, such as magenta and green. Filter 15, as illustrated in FIG. 2, is comprised of a vertically directed central strip selected to pass one color, such as magenta, and two generally segmental portions on either side thereof selected to pass the second color, such as green. These colors are indicated in their respective regions on filter 15.

In FIG. 1, a first array 16 of lenticular lenses 17 is situated on the output side of filter 15. Each lens 17 is of spherical configuration on one side thereof and is positioned so that its focal point falls in an open or transparent region within a Schlieren input mask 18 situated between lenticular lens array 16 and light-modulating medium 11. Lenticules 17 of array 16 are thus formed on the resulting concave side of the configuration assumed by array 16. In an alternative embodiment, filter 15 may be formed directly upon the convex surface of array 16 so as to assume essentially the same curvature thereof.

Schlieren optics-type input mask 18 is situated adjacent lenticular lens array 19 on the concave side of the array so as to permit passage of light from lenses 17 between the opaque portions of the input mask. That is, each of the slots in Schlieren input mask 18 is positioned to lie along minimal optical paths from the one focus of elliptical reflector 12, at which light source 10 is located, and the other focus of reflector 12, located at the center of the active area of light-modulating medium 11. In addition, each of lenticular lenses 17 is centered on a respective one of these minimal optical paths between reflector 12 and the center of the active area of medium 11 so as to assure that arc source 10 illuminates the center of each of lenticules 20 formed on the convex side of a second lens array 19. Likewise, each of lenticular lenses 20 is centered on a respective one of the minimal optical paths between reflector 12 and the center of the active area of medium 11 so as to assure that each respective on of lenticules 17 is imaged onto the active area of light-modulating medium 11. Thus, the pattern of lenses of array 16 is homothetic to the pattern of lenses of array 19.

An image area defining mask 25 is formed on the generally concave surface assumed by lenticular lens array 16. Mask 25 is situated between reflector 12 and the center of the active area of medium 11, with each of the openings in mask 25 positioned to lie along minimal optical paths between the one focus of elliptical reflector 12, at which light source 10 is located, and the other focus of reflector 12. A detailed description of mask 25 is set forth in conjunction with the description of FIG. 4.

Situated on the light output side of light-modulating medium 11 are an imaging lens 21, a Schlieren optics output mask 22 of configuration complementary to that of Schlieren optics input mask 18, and a projection lens 23. In absence of any light modulation imparted by medium 11, imaging lens 21 images each of the secondary sources, or images of light source 10 emanating from the slots in Schlieren input mask 18, onto a respective portion of an opaque bar on Schlieren output mask 22. This undeviated light is thus blocked by Schlieren output mask 22. Light modulation imparted by diffraction gratings formed in medium 11, on the other hand, produces corresponding deviations in the path of light incident thereon, enabling the light to pass through slots adjacent the bars in Schlieren output mask 22, as illustrated, with intensity determined by depth of the gratings. Light passing through the slots in Schlieren output mask 22 is projected by projection lens 23 onto a remotely located display screen 24 to produce an enlarged image of the information impressed on light-modulating medium 11. Those skilled in the art will appreciate the fact that imaging lens 21 and projection lens 23 may each actually comprise a plurality of lenses in order to appropriately correct for aberrations.

Because lenticular lenses 17 of array 16 are illuminated with light of either the one color, such as magenta, or the second color, such as green, depending upon their locations with respect to the central strip and the two segmental portions of optical filter 15, the slots of Schlieren input mask 18 are similarly illuminated. Since each color must illuminate a raster with an aspect ratio of 3 to 4, the center-to-center spacing of Schlieren input mask slots illuminated by green light has heretofore been restricted to a fixed ratio of the center-to-center spacing of the input mask slots illuminated by magenta light, typically 3 to 4. However, this imposes a severe restriction on design of the Schlieren input mask, and hence on the Schlieren output mask, resulting in a compromise in performance between the portions of each Schlieren mask illuminated by magenta light and the portions of each Schlieren mask illuminated by green light. Nevertheless, United States television standards require the raster area, or televised image, to have an aspect ratio, or ratio of height to width, of 3 to 4. Accordingly, the center-to-center spacing of horizontally directed slots in each Schlieren mask conventionally is made three-fourths the center-to-center spacing of vertically directed slots in the respective Schlieren input mask. In addition, each of the lenticules in the lenticular lens array is also so proportioned.

To preclude the compromise which results when the center-to-center spacing ratio of horizontal slots to vertical slots in the Schlieren input mask is restricted to a particular ratio, it previously has been proposed to rearrange the locations of lenticules in lenticular array 16 to eliminate this aspect ratio relationship requirement. Thus, lenticular lens array 16 would be separated into a central section aligned with the centrally located magenta strip in filter 15 and sectorial regions on either side of the central section aligned with the sectorially located green sections of filter 15. The lenticules in each section of array 16 would each have the same aspect ratio as that of the raster and be arranged in vertical columns and horizontal rows. However, the dimensions and focal length of the lenticules in the center section of lenticular array 16 would be different from the dimensions and focal length of the lenticules in the sectorial sections. Moreover, the lenticules of the central section of array 16 would be situated at different axial locations with respect to the sectorial portions thereof. Details of an arrangement of this type are set forth in the aforementioned W. E. Good et al. U.S. Pat. No. 3,330,908. While such arrangement is beneficial, it is somewhat inconvenient in a light valve in that precise positioning of four separate lenticular lens arrays is required. The present invention, on the other hand, achieves the desired result without requiring any lenticular lens arrays to be split into a plurality of sections, and hence without the inconvenience attendant thereto.

Figure 3:
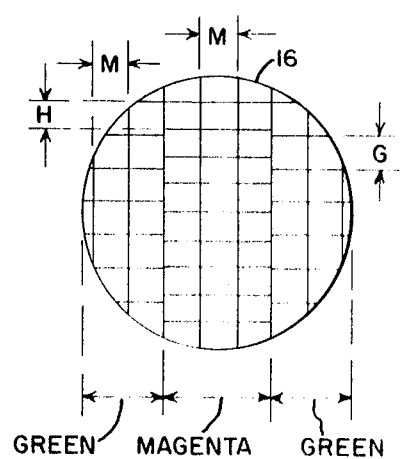
FIG. 3 is a plan view of an array of lenticular lenses for imaging a light source onto the slots of a Schlieren optics input mask employed in the system of the invention.

In FIG. 3, which is a plan view of lens array 16 of FIG. 1, the lenticules of the array are demarcated by rectangles having a width designated M. However, the height of each lenticule in the central region, indicated as being illuminated by magenta light, is designated H, while the height of each lenticule in the sectorial regions, indicated as being illuminated by green light, is designated G. The aspect ratio of the lenticular lenses of array 16 illuminated by magenta light is thus different from that of the lenticular lenses of array 16 illuminated by green light. For example, the following relative sizes may be chosen.

$$H=0.75M$$

$$G=0.9M$$

In this manner, center-to-center spacing of the slots in the magenta region of the Schlieren input mask can be made completely independent from that of the slots in the green region without splitting lenticular lens array 16 into two axially displaced surfaces. The particular design illustrated in FIG. 3 allows the horizontal slots of the Schlieren input mask, which are conveniently illuminated with green light, to have a center-to-center spacing 20 percent greater than that permitted by lenticules of the type previously employed; that is, the green spacing is 90 percent of the magenta spacing, rather than 75 percent. This permits complete blocking of the second order green images, resulting in improved dark field.

Figure 4:
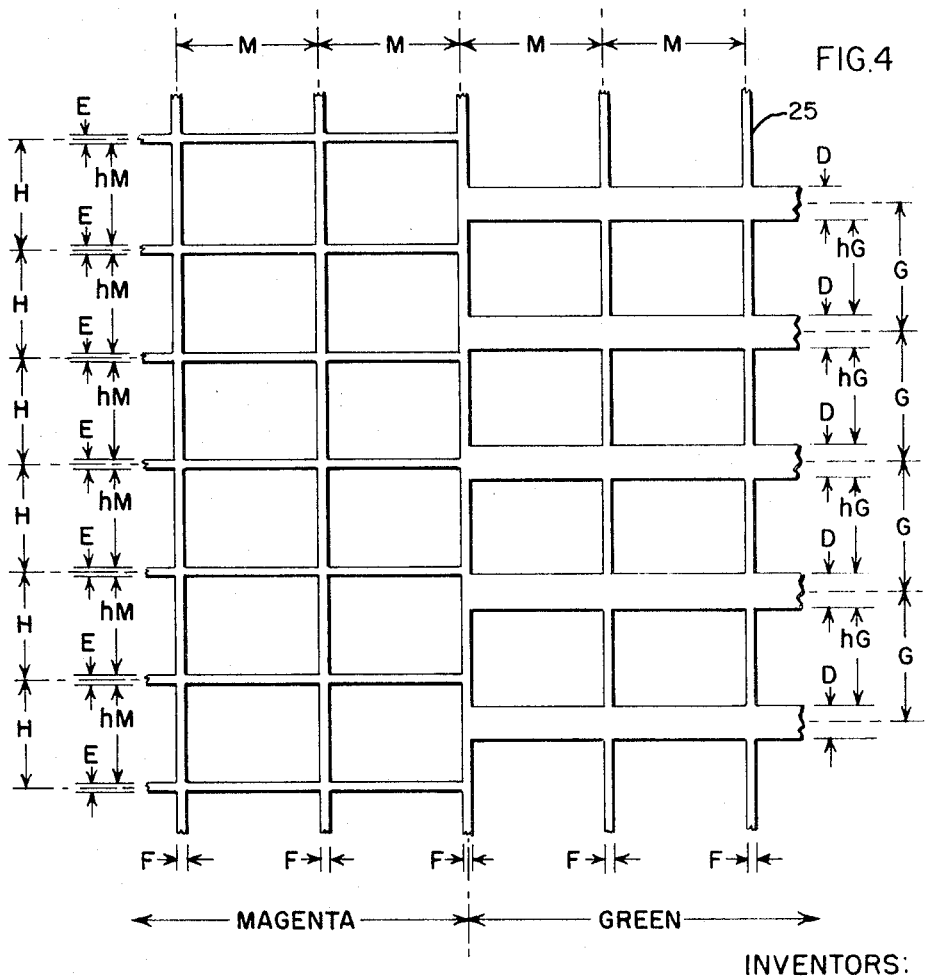
FIG. 4 is a plan view of a portion of the light input mask employed in the system of the invention, as viewed along line 4-4 of FIG. 1.

By employing the lenticular lens array of FIG. 3 in the system of FIG. 1, a slight overfill of light at the raster results; that is, illumination of an area larger than the raster area takes place. This light overfill, however, may be masked by employing an appropriate image area defining mask pattern without an appreciable reduction in light transmission efficiency. One such pattern is illustrated in FIG. 4, which is a portion of a sectional view along line 4-4 of FIG. 1. FIG. 4 illustrates a region which, as indicated, is illuminated by green light on one side and magenta on the other. In addition to the previous equations set forth for $G$ and $H$, the following expressions are also applicable, where 10 percent is employed as the basic overfill, designated $F$, and where $E$ also represents overfill:

$$F=0.1M$$

$$E=0.075M$$

$$hG=hM=H-E=(0.75-0.075)M=0.675M$$

$$D=G-hG=(0.9-0.675)M=0.225M$$

An image area defining mask of the type shown in FIG. 4 has an important useful property since, if the lenticules of array 16 in the system of FIG. 1 are all designed for some minimum amount of overfill, the light body at the raster is more sharply defined and is surrounded by a dark band. This reduces the amount of precision with which raster stop 9 must be fabricated, and also serves to eliminate the slightly out-of-focus edges of such stop produced when a Schlieren input mask is employed without any additional input masking. Moreover, each lenticule is thereby masked in a fashion to produce a precisely located image at the raster, thus compensating for distortions such as keystone effect. In addition, illumination distribution at the raster may be controlled by appropriate shading of the lenticules of array 16.

Figure 5:
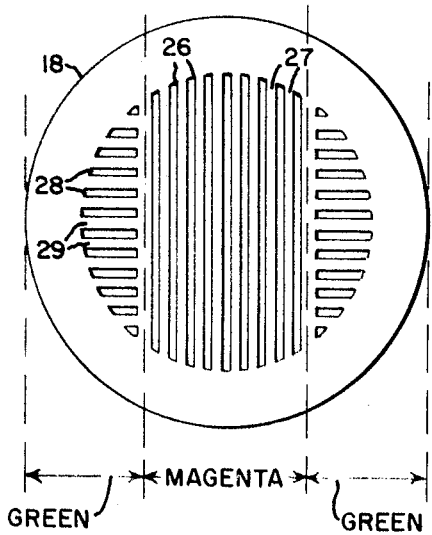
FIG. 5 is a plan view of a Schlieren optics input mask employed in the system of the invention, as viewed along line 5-5 of FIG. 1.

FIG. 5 is a sectional view along line 5-5 of FiG. 1, showing the configuration of Schlieren input mask 18. Typically, mask 18 comprises centrally located vertical slots 26 separated by opaque vertical bars 27, situated in a region illuminated by magenta light, and sectorially located horizontal slots 28 separated by opaque horizontal bars 29, situated in regions illuminated by green light. By virtue of the present invention, center-to-center spacing of slots 26 is independent of center-to-center spacing of slots 28.

Schlieren output mask 22 resembles Schlieren input mask 18, with the exception that the slots and bars are interchanged. Accordingly, in the Schlieren output mask, regions 26 would comprise opaque vertical bars and regions 27 would comprise vertical slots, while regions 28 would comprise opaque horizontal bars and regions 29 would comprise horizontal slots.

Since the horizontal slots of Schlieren input mask 18 have a center-to-center spacing 20 percent greater than previous Schlieren input masks, the horizontal bars of Schlieren output mask 22 likewise have center-to-center spacing 20 percent greater than previous Schlieren output masks. Thus, the horizontal slots of the Schlieren output mask are 20 percent wider than those of previous Schlieren output masks. As a result, more light may be passed through the system, improving its efficiency, and diffraction effects produced by the Schlieren output mask may be reduced, improving resolution of displayed images. Both improvements may be achieved concurrently.

Figure 6:
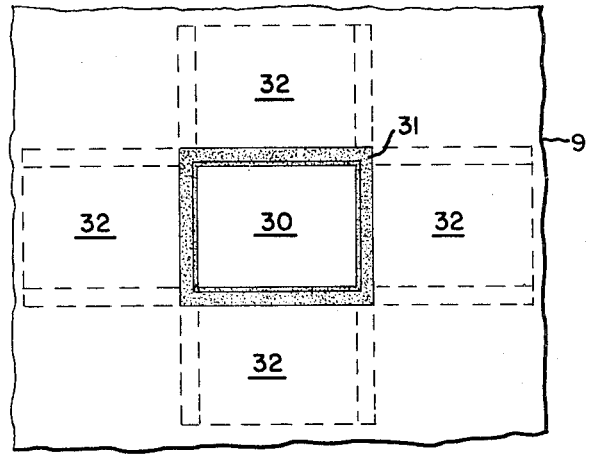
FIG. 6 is a plan view of an illuminated light modulating medium employed in the system of the invention, as viewed along line 6-6 of FIG. 1.

FIG. 6, which is a sectional view along line 6-6 of FIG. 1, illustrates the effect of illumination in the system of FIG. 1 at the raster area on medium 11. Raster area 30 is surrounded by a dark or blocked border 31, which serves to define and precisely outline the raster area containing image information to be displayed. This also serves to ease somewhat the requirement of precision in fabricating the inner perimeter of stop 9 of the system. Spurious images 32 of the light source are formed above, below, and on either side of the raster area, but these light source images are blocked by stop 9 from interfering with the desired image being displayed.

By employing the system of FIG. 1, no compromise in Schlieren input mask slot spacing for different colors need be made. The center-to-center spacing of the Schlieren input mask slots for magenta light is made independent from that for the green, without any need for splitting lenticular lens array 16 into two, axially displaced surfaces. In this way, performance of Schlieren input mask 10 need not be compromised but, instead, may be optimized for each separate color impinging thereon.

The foregoing describes light valve projection apparatus in which center-to-center spacing of Schlieren input mask slots illuminated by light of one color is completely independent of center-to-center spacing of Schlieren input mask slots illuminated by light of a second color, facilitating improved dark fields for specific colors and enhancing efficiency, resolution, or both. In addition, the degree of precision by which a stop is required to outline a raster is reduced.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. In optical projection apparatus employing a light-modulating medium containing an image in the form of a plurality of diffraction gratings, a source of bichromatic light, and a Schlieren input mask having slots in one region extending along one direction and in a second region extending along a different direction, said bichromatic light being directed onto said Schlieren input mask and illuminating said one region with light of one color and said second region with light of a second color so as to produce light of both said colors on said medium, and a remote display surface on which light emergent from said medium through an output mask impinges to form a visible image, the improvement comprising a single first array of lenses situated between said source of bichromatic light and said Schlieren input mask, said single first array being illuminated by light of said one color in a first zone and by light of said second color in a second zone, said lenses within said first zone having a different aspect ratio than said lenses within said second zone so as to permit optimum spacing of the Schlieren input mask slots in each of said first and second regions thereof for each of said first and second colors, respectively.

2. The apparatus of claim 1 wherein said one color comprises magenta, said second color comprises green, and said lenses within said first zone are of smaller size than said lenses within said second zone.

3. The apparatus of claim 1 including a second array of lenses situated between said light-modulating medium and said single first array, said second array being illuminated by light of said one color in a first area and by light of said second color in a second area, said lenses within said first area of said second array having the same aspect ratio as the lenses within the first zone of said single first array and said lenses within said second area of said second array having the same aspect ratio as the lenses within the second zone of said single first array, said lenses of said second array being arranged in a pattern homothetic to the pattern of lenses of said single first array.

4. The apparatus of claim 3 wherein said one color comprises magenta, said second color comprises green, said lenses within said first zone of said single first array are of smaller size than said lenses within said second zone of said single first array, and said lenses of said second array within said first area are of smaller size than said lenses of said second array within said second area.

5. The apparatus of claim 3 including an image area defining mask situated in contact with said single first array of lenses, said image area defining mask comprising a plurality of apertures of identical aspect ratio arranged in one regular order in a location illuminated by light of said one color emanating from said single first array of lenses within said first zone and arranged in another regular order in a location illuminated by light of said second color emanating from said single first array of lenses within said second zone.

6. The apparatus of claim 5 wherein said one color comprises magenta, said second color comprises green, said lenses within said first zone of said single first array are of smaller size than said lenses within said second zone of said single first array, and said lenses of said second array within said first area are of smaller size than said lenses of said second array within said second area.

7. The apparatus of claim 3 wherein said second array of lenses is situated adjacent said Schlieren input mask between said Schlieren input mask and said first array of lenses.

8. The apparatus of claim 7 including an image area defining mask situated in contact with said single first array of lenses, said image area defining mask comprising a plurality of apertures of identical aspect ratio arranged in one regular order in a location illuminated by light of said one color emanating from said single first array of lenses within said first zone and arranged in another regular order in a location illuminated by light of said second color emanating from said single first array of lenses within said second zone.